United States Patent [19]

Fauck

[11] 4,299,427
[45] Nov. 10, 1981

[54] ADJUSTING ARRANGEMENT FOR VARIABLE LOAD VALVE DEVICE

[75] Inventor: Gerhard Fauck, Hanover, Fed. Rep. of Germany

[73] Assignee: WABCO Fahrzeugbremsen GmbH, Hanover, Fed. Rep. of Germany

[21] Appl. No.: 140,347

[22] Filed: Apr. 14, 1980

[30] Foreign Application Priority Data

Apr. 27, 1979 [DE] Fed. Rep. of Germany ....... 2917073

[51] Int. Cl.³ .............................................. B60T 8/22
[52] U.S. Cl. ................................................ 303/22 A
[58] Field of Search ................ 303/22 A, 22 R, 23 A, 303/23 R

[56] References Cited

U.S. PATENT DOCUMENTS 2,940,796 6/1960 Ortmann et al. ................. 303/22 A
3,369,846 2/1968 Scott ................................. 303/22 A Primary Examiner—Duane A. Reger
Attorney, Agent, or Firm—G. J. Falce

[57] ABSTRACT

A variable load valve device having a piston subject to air spring pressure that varies with vehicle loading to position a cam member formed on a control piston in accordance with the vehicle load condition. The cam member acts through a plunger or push rod to operate a relay valve device via which brake pressure is controlled. A spring that acts on the control piston in opposition to air spring pressure has an adjustable deflection characteristic wherein a clamping device threaded within the spring coils is rotated by a screwdriver or the like. An adjustable screw that serves as a stop for the spring clamp member is provided with a through bore to accommodate passage of the screwdriver into engagement with a slot in the clamp member to facilitate rotation of the clamp, without requiring valve disassembly or component replacement.

6 Claims, 1 Drawing Figure

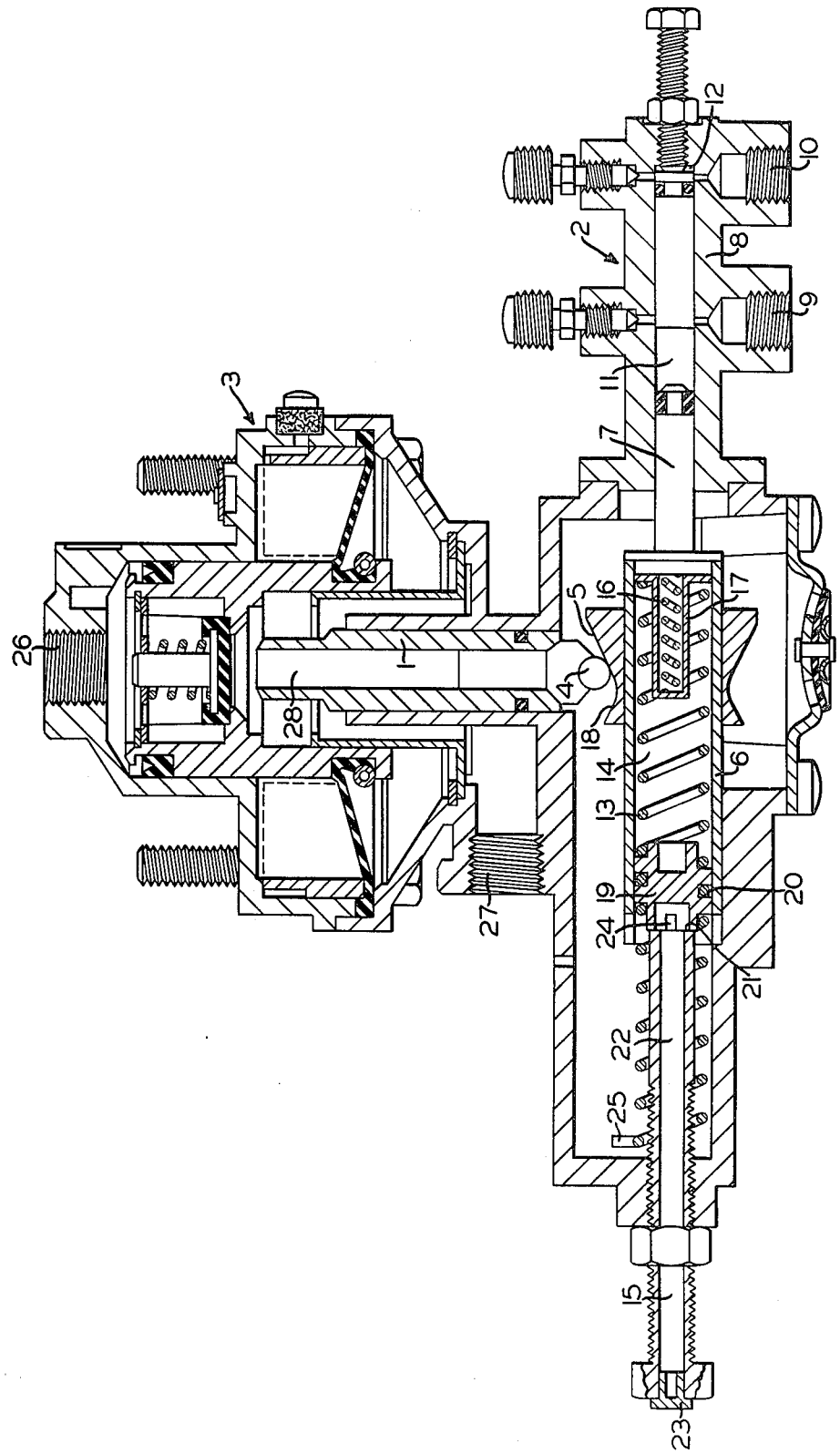

ADJUSTING ARRANGEMENT FOR VARIABLE LOAD VALVE DEVICE

BACKGROUND OF THE INVENTION

The present invention is related to load responsive brake apparatus and more particularly to a variable load valve device that provides brake pressure according to the effective pressure of air springs that support and thus reflect the load carried by the vehicle.

Typically, the load dependent air spring pressure acts on an actuating member in opposition to a helical control spring. The position of this actuating member conditions a relay valve to provide braking pressure according to the vehicle load. In order to adapt the variable load valve device to vehicles having different conditions of utilization, it is possible to not only adjust the spring tension, but also the spring deflection for a given load. The spring tension adjustment is normally carried out by means of an externally accessible adjusting screw, whereas the degree of spring deflection is controlled by adjusting the number of spring coils by rotation of a clamp device having a spiral groove about its periphery for engagement with the helical control spring. The spring tension adjustment is accomplished, as above mentioned, by an externally accessible adjusting screw and thus requires no disassembly or replacement of the components. Adjustment of the clamp device to vary the number of active spring coils, however, does require disassembly of the adjusting components including the spring tension adjustment screw.

SUMMARY OF THE INVENTION

The object of the invention, therefore, is to provide a simple arrangement for adjusting a variable load valve device for different conditions of utilization without disassembling the valve device or replacing any components.

The objective is accomplished by providing the existing spring tension adjusting screw with a through bore via which a screwdriver or like tool may be inserted for engagement with a slot formed in the spring clamp device. By means of this tool, therefore, the clamping device may be rotated to displace the clamp device axially within the control spring to vary the number of active spring coils without any disassembly whatsoever. The spring tension adjusting screw abuts the end of this clamp device and thus provides for establishing a predetermined spring tension.

BRIEF DESCRIPTION OF THE DRAWING

In the accompanying single FIGURE drawing, there is shown a sectional assembly view of the variable load valve device comprising the present invention.

DESCRIPTION AND OPERATION

An actuating member in the form of a plunger 1 produces a load-dependent regulatory connection between a load control section 2 and a brake pressure regulator section 3 in the variable load valve device of the invention. Plunger 1 is formed at its lower end 4 for engagement with a cam 5 that forms a conically-shaped surface on a hollow control piston 6. One end 7 of piston 6 is hermetically sealed at its one side in a cylinder 8. In the embodiment shown, the cylinder 8 is subject to the pressure from two control circuits (not shown) via air spring connections 9 and 10, which pressure acts on the control piston 6 in one direction via pressure chambers 11 and 12.

An adjustable, helical control spring 13 is arranged in the cavity 14 of control piston 6 in such a way that its tension opposes the force of the air spring control pressure acting on piston 6. The tension of this spring 13 is adjustable by means of a bolt 15, that has threaded engagement with the casing of load control section 2.

An additional second spring 16 is arranged inside spring 13 in such a way that this second spring 16 is connected in series with spring 13 via a cup-shaped intermediate piece 17. Another conical surface integral with the cam 5 acting as the support of the plunger end 4 is configured in the direction of motion opposite that of the control poston 6, and serves as a conical emergency-brake cam 18.

In the coils of the adjustment spring 13, a cylindrically configured clamp 19 is arranged with a spiral-shaped groove 20 that engages the coils of the spring 13. The adjusting screw 15, having an end 21 serving as a stop for the clamp 19, is provided with a longitudinal through bore 22. This bore is closed at the other end with a cover 23. The side of clamp 19 facing the bore 22 is provided with a slot 24 for the application of a tool, a screwdriver, for example, introduced through the bore 22. The adjustment spring 13 is protected against shifting on adjustment of the clamp by means of a bent-out end 25 that engages in a corresponding groove formed in the casing of load control section 2.

The following functional description treats the operation of the brake pressure regulator section 3 of the variable load valve device only to the extent that it is necessary for understanding.

The variable load valve device is attached to the frame of the vehicle and is connected via lines to the vehicle air springs mounted on the axles. In the empty state of the vehicle, there is lower pressure in the air-cushion bellows so that control spring 13 is effective to force control piston 6 to a position corresponding to the lowest position of the plunger 1 on cam 5.

If the vehicle is loaded, then the pressure in the air springs increases and the compressed air flowing into the chambers 11 and 12 via the connections 9 and 10 of cylinder 8 transmits this pressure increase to the piston 6, so that it moves against spring 13 in the direction of the full-load position. The resulting change of position of the plunger 1 by cam 5 causes a load-dependent regulation of the braking pressure flowing from inlet connection 26 to the brake cylinders via connection 27.

After removal of the brake pressure, the air in the brake cylinders is released to the atmosphere via a bore 28 in the plunger 1.

In order to establish a desired spring deflection characteristic to correlate brake pressures with vehicle load conditions of a particular vehicle, the number of active coils of adjusting spring 13 is increased or decreased. This adjustment is accomplished, in accordance with the present invention, by removing cover 23 and inserting a screwdriver, for example, through bore 22 and into engagement with slot 24 of clamp device 19. Rotation of clamp device 19 with the aid of this screwdriver causes the clamp device to move axially forward or backward within spring 13, due to the helical groove 20 guiding the clamp by screw action, it being understood that this adjustment is accomplished without necessitating disassembly of the variable load valve device to gain access to the clamp 19. After positioning clamp device 19, as desired, adjusting screw 15 is then adjusted to place its end 21 against clamp 19, so as to provide a stop therefor, and to accordingly establish the number of spring coils comprising the effective spring length. The adjusting screw 15 may be further adjusted to compress spring 13 and thus establish the load pressure required to overcome the spring force and effect movement of control piston 6.

Having thus described the invention, what I claim as new and desire to secure by Letters Patent, is:

1. For a vehicle having load dependent fluid pressure cushion means supporting the vehicle, there is provided a variable load valve device for automatically developing brake pressure in accordance with the vehicle load condition comprising:
   (a) relay valve means for providing said brake pressure, said relay valve means including an actuating member; and
   (b) vehicle load responsive means for effecting adjustment of said relay valve means so as to vary said brake pressure according to the vehicle load condition including:
      (i) a control piston operative responsive to the load dependent fluid pressure of said cushion means to position said actuating member of said relay valve means;
      (ii) a helical spring acting on said control piston in opposition to the fluid pressure of said cushion means;
      (iii) clamp means for varying the number of active coils of said helical spring; and
      (iv) an adjusting screw having one end engageable with said clamp means to vary the degree of tension of said helical spring, and the other end arranged externally of said variable load valve device;
   wherein the improvement comprises:
   (c) adjusting means including said adjusting screw for varying the position of said clamp means within the coils of said helical spring from a location external of said variable load valve device without disassembly thereof.

2. A variable load valve device as recited in claim 1, wherein said adjusting means comprises:
   (a) a through bore formed axially in said adjusting screw;
   (b) said clamp means having a side contiguous with said one end of said adjusting screw arranged with a slot aligned with said through bore; and
   (c) a tool adapted to enter said bore at said other end of said adjusting screw for engagement with said slot in said clamp means to vary the position thereof within the coils of said spring by rotation of said tool.

3. A variable load valve device as recited in claim 2, further characterized in that the casing of said variable load valve device is screw-threaded to receive said adjusting screw for axial displacement relative to said side of said clamping means.

4. A variable load valve device as recited in claim 2, further comprising means for preventing torsion of said helical spring during rotation of said clamp means by said tool.

5. A variable load valve device as recited in claim 4, wherein said means for preventing torsion of said spring includes:
   (a) a groove formed in the casing of said variable load valve device; and
   (b) said helical spring having one end arranged to engage said groove.

6. A variable load valve device as recited in claim 2, further comprising means for covering said bore of said adjusting screw at said other end thereof when said tool is removed.

* * * * *